United States Patent

Rummler

[15] 3,665,670
[45] May 30, 1972

[54] LOW-MASS TRUSS STRUCTURE

[72] Inventor: Donald R. Rummler, Hampton, Va.

[73] Assignee: The United States of America as represented by the Administration of the National Aeronautics and Space Administration

[22] Filed: Apr. 28, 1970

[21] Appl. No.: 32,664

[52] U.S. Cl. ............................52/648, 52/655, 287/54 A
[51] Int. Cl. .....................................E04h 12/06, E04h 12/10
[58] Field of Search .................52/648, 655; 287/54 A, 54 B; 285/150, 177

[56] References Cited

UNITED STATES PATENTS

| | | | |
|---|---|---|---|
| 2,578,364 | 12/1951 | Maxon | 52/646 |
| 2,705,061 | 3/1955 | Getz | 52/114 |
| 3,083,793 | 4/1963 | Brout | 52/648 |
| 2,877,030 | 3/1959 | Hurley et al. | 287/54 A |
| 3,371,458 | 3/1968 | Sturgill | 52/648 |
| 3,472,536 | 10/1969 | Ingram | 285/177 |
| 3,021,159 | 2/1962 | Back | 287/54 A |
| 3,387,864 | 6/1968 | Walters | 285/23 |
| 3,461,635 | 8/1969 | Hughes | 52/648 |

FOREIGN PATENTS OR APPLICATIONS

| | | | |
|---|---|---|---|
| 1,575,753 | 7/1969 | France | 52/648 |
| 976,692 | 11/1950 | France | 52/648 |
| 280,556 | 5/1928 | Great Britain | 285/178 |
| 629,752 | 12/1961 | Italy | 285/150 |
| 1,241,933 | 8/1960 | France | 285/150 |

OTHER PUBLICATIONS

Skeletal Frameworks and Stressed-Skin System, John Borrego 12/18/1968 p. 15–17.

*Primary Examiner*—Frank L. Abbott
*Assistant Examiner*—Leslie A. Braun
*Attorney*—Howard J. Osborn, Wallace J. Nelson and John R. Manning

[57] ABSTRACT

A low-mass truss structure wherein a plurality of angular disposed elongated thin-walled tubular segments are connected to a plurality of joint clusters formed of short tubular members to form a unitary truss structure.

1 Claim, 5 Drawing Figures

Patented May 30, 1972 3,665,670

INVENTOR.
DONALD R. RUMMLER
BY
*Howard J. Osborn*
*Wallace J. Nelson*
ATTORNEYS

Patented May 30, 1972
3,665,670
2 Sheets-Sheet 2
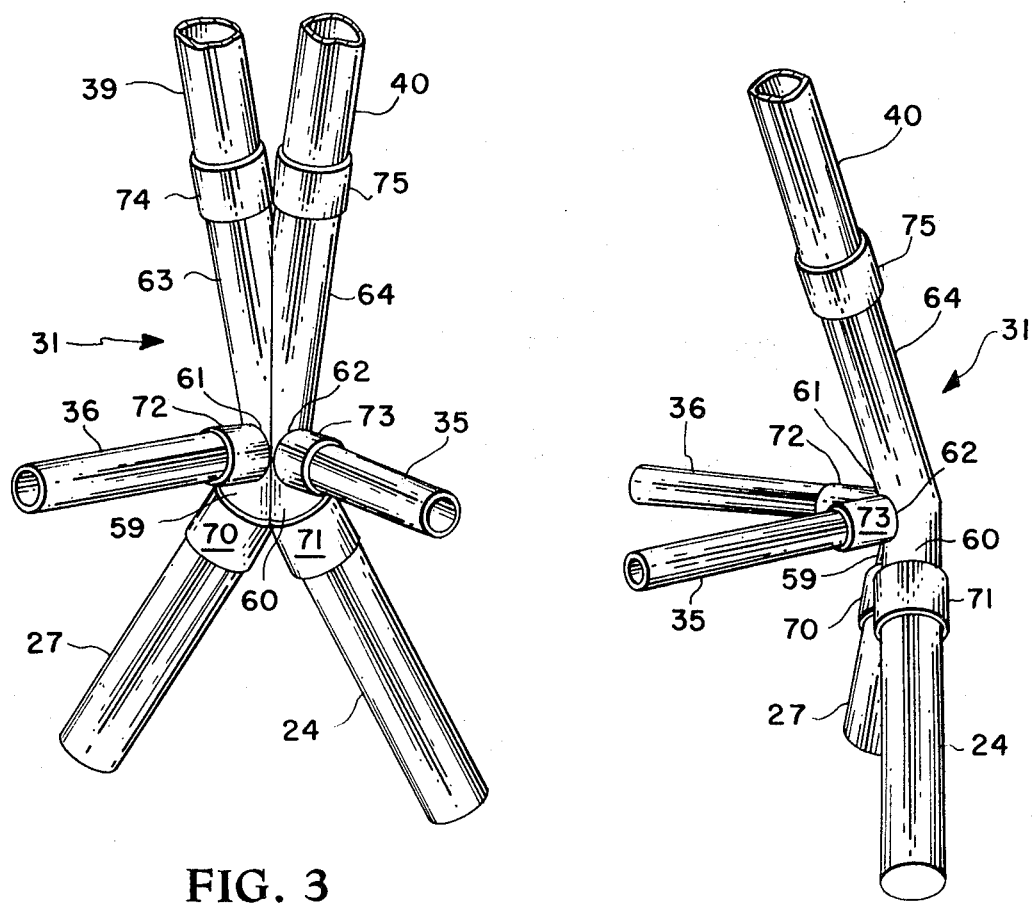
FIG. 3
FIG. 4
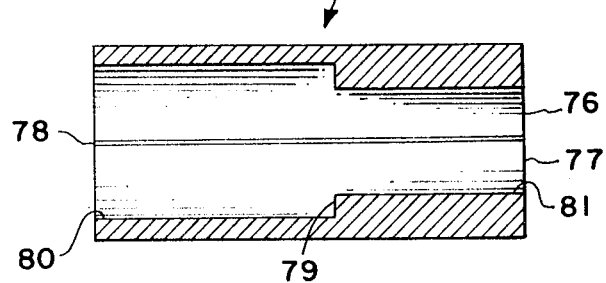
FIG. 5
INVENTOR.
DONALD R. RUMMLER
BY Howard J. Osborn
Wallace J. Nelson
ATTORNEYS

LOW-MASS TRUSS STRUCTURE

This invention was made by an employee of the National Aeronautics and Space Administration and may be manufactured and used by or for the Government of the United States without the payment of any royalties thereon or therefor.

This invention relates generally to a lightweight truss-type structure and relates in particular to a low-mass truss structure formed of a plurality of angular disposed tubular segments connected to a plurality of joint clusters formed of short tubular members to form a unitary truss structure.

In the fabrication of any type of spacecraft, serious consideration must be given to the total weight of the structure due to the limited capabilities of present-day propulsion and booster engines employed in launching spacecraft. Also, obviously, the lower the weight of the payload or spacecraft to be launched leads to the adaptibility of lower cost launch vehicles. By reducing the weight of the basic spacecraft structure to be launched, additional components and increased weight may be considered for the vehicle payload such as electronic equipment and the like.

It is therefore an object of the present invention to provide a low-mass construction for truss-type structures to be employed in spacecraft and the like.

Another object of the present invention is to provide a tubular construction for truss-type structures.

A further object of the present invention is to provide a new and novel joint structure for connecting various components in a truss structure.

Another object of the present invention is to provide a stepped split-sleeve connector for components in a low-mass truss structure.

Another object of the present invention is the use of lightweight thin-walled tubing for fabricating truss structures for use in lightweight spacecraft or the like where total weight is critical.

Yet another object of the present invention is the use of high modulus, brittle, thin-walled truss members which cannot be fabricated or joined with conventional fabrication methods such as welding or by the use of mechanical fasteners.

A further object of the present invention is the accurate placement of truss joints in a truss structure to thereby remove the possibility of built-in fabrication stresses normally occurring in welded and other mechanically joined truss configurations.

According to the present invention the foregoing and other objects are attainable by providing a plurality of angular disposed elongated thin-walled tubular segments connected to a plurality of joint clusters to form a unitary truss structure. The joint clusters are formed of a plurality of short thin-walled tubular members welded or otherwise integrally connected in an angular relationship to form a plurality of legs that provide connection with the angular disposed elongated tubular segments. A split sleeve is employed to connect each elongated tubular segment to the joint clusters with the tubular sleeve being adhesively bonded both to the elongated tubular segment and to the leg of the joint cluster. Where the diameter of the elongated tubular segment is different from that of the joint cluster leg to which it is to be attached, the split sleeve employed is of stepped configuration so as to snugly engage both parts when the adhesive is employed to bond the two members thereto. Suitable lightweight materials that have been employed to make truss-structures according to the present invention are aluminum, beryllium, BE-38AL alloy tubing, an uniaxial boron or glass filament reinforced epoxy tubing.

A more complete appreciation of the invention and many of the attendant advantages thereof will be readily apparent as the same becomes better understood by reference to the following more detailed description when considered in connection with the accompanying drawings wherein:

FIG. 3 is an enlarged view of one of the joint clusters and split sleeves used to make the truss structure shown in FIGS. 1 and 2;

FIG. 4 is another view of the joint cluster shown in FIG. 3; and

FIG. 5 is a sectional view of a stepped split sleeve employed with the joint cluster shown in FIGS. 3 and 4 when joining tubular parts of different diameters.

Figure 1:
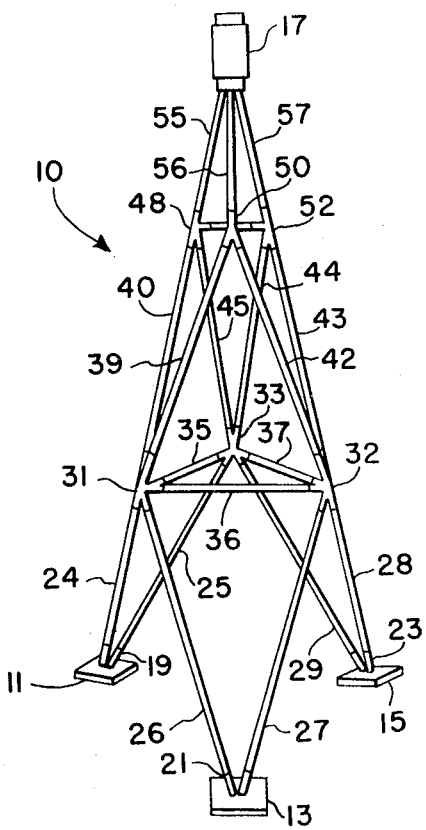
FIG. 1 is a front view of a low-mass structure according to the present invention.
Figure 2:
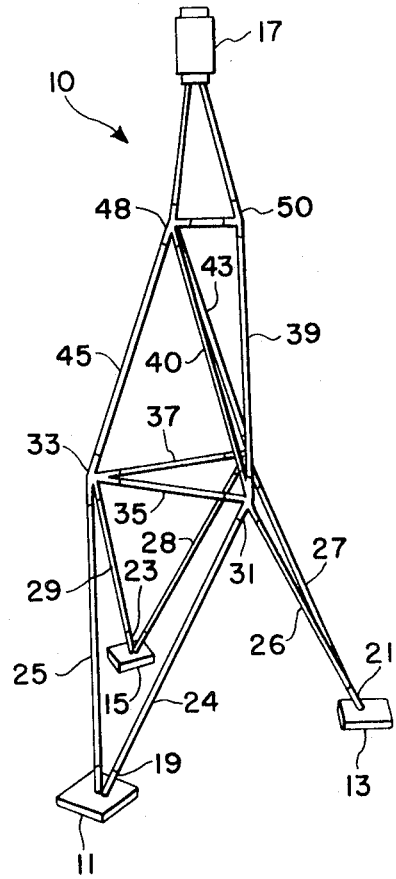
FIG. 2 is a side view of the low-mass truss structure shown in FIG. 1.

Referring now more particularly to the drawings, wherein like reference numerals designate identical or corresponding parts throughout the several views and more particularly to FIGS. 1 and 2, there is shown a truss structure according to the present invention and generally designated by reference numeral 10. Truss structure 10 is provided with three foot pads as designated by reference numerals 11, 13 and 15, and one head or top fitting 17. Each of the foot pads 11, 13 and 15 and top fitting 17 are adapted to be rigidly attached to the skin layers or wall structure of the particular spacecraft or other structure requiring truss support of this type. This rigid attachment may be accomplished by any conventional method such as by welding, riveting or adhesively bonding with the composition of the structure skin or wall being the determinative factor in selecting the optimum connecting process.

Each of foot pads 11, 13, and 15 is provided with an integrally attached joint cluster as designated, respectively, by reference numerals 19, 21 and 23. These joint clusters are each provided with two legs angularly disposed relative to each other for connection with respective elongated thin-walled tubular segments 24 and 25; 26 and 27; and 28 and 29. The tubular pair 24 and 25 also connect respectively with joint clusters 31 and 33 while tubular pair 26 and 27 connect, respectively, with joint clusters 31 and 32 and tubular pair 28 and 29 connect, respectively with joint clusters 32 (not visible in FIG. 2) and 33. In addition to the depending legs on joints clusters 31, 32 and 33 for receiving these tubular pairs, each cluster is provided with a pair of angularly disposed horizontal legs and a pair of angularly disposed vertical legs. The horizontal legs on joint cluster 31 connect with horizontal tubular segments 35 (not visible in FIG. 2) and 36, joint cluster 32 connects with tubular segments 36 and 37, while joint cluster 33 connects with horizontal tubular segments 37 and 35. The angularly disposed vertical legs on each joint cluster 31, 32 and 33 connect, respectively, with pairs of vertically extending elongated tubular segments as designated by reference numerals 39, 40; 42, 43; and 44,45. Tubular segments 42 and 44 are not easily visible in FIG. 2. The vertically extending tubular segments 39 and 40 also connect, respectively, with depending angularly disposed legs on joint clusters 48 and 50; while vertically extending tubular segments 42 and 43 connect with depending angularly disposed legs on joint clusters 50 and 52 and vertically extending tubular legs 44 and 45 connect, respectively, with angularly disposed legs on joint clusters 52 and 48. Each of joint clusters 48, 50 and 52 are also provided with a pair of angularly disposed horizontal legs for receiving three tubular segments in a triangular fashion, as described hereinbefore for horizontal tubular segments 35, 36 and 37. The horizontal segments forming this smaller triangular are not designated in the interest of clarity. Each of joint clusters 48, 50 and 52 are further provided with a single vertically disposed leg formed at an angle such that lines extending from each leg would meet at a central point. These vertically extending legs connect, respectively, with elongated tubular segments 55, 56 and 57. These tubular segments converge toward a point within head fitting 17 and are received therein by a joint cluster, similar to those described hereinbefore and, not shown.

Referring now more particularly to FIGS. 3 and 4 the details of one joint cluster will now be described, it being understood that the remaining joint clusters are of similar construction, some differing only in the number of legs formed thereon. For discussion as to the details of a particular cluster, joint cluster 31 will be described. As shown in FIGS. 3 and 4, cluster 31 includes two angularly disposed depending legs 59 and 60, two shorter horizontal and angularly disposed legs 61 and 62 (partially obscured in the drawings) and two vertically and angularly disposed legs 63 and 64. Leg 59 connects to tubular segment 27; leg 60 to tubular segment 24; leg 61 to segment 36; leg 62 to segment 35; leg 63 to segment 39; and leg 64 to segment 40. As shown in the drawing, the connection between each leg and its tubular segment is made by a two-part split tubular sleeve with the sleeve connecting leg 59 and segment 27 being designated by reference numeral 70; the sleeve connecting leg 60 and segment 24 designated by reference numeral 71; sleeve 72 connecting leg 61 and segment 36; sleeve 73 connecting leg 62 and segment 35; sleeve 74 connecting leg 63 and segment 39; and, sleeve 75 connecting leg 64 and segment 40. As required, the legs of the joint cluster 31 and the others may be formed of larger diameter tubing than required for the individual elongated segments connected thereto. This larger diameter tubing provides more rigidity to the joint cluster and serves as an aid in assembling the joint. In order to provide a good bond between the joint cluster legs and the elongated tubular segments, it is therefore necessary to provide the various split sleeve connectors of a stepped configuration such as shown for sleeve 72 in FIG. 5. As shown therein, sleeve 72 includes tubular halves 76 and 77 joined by a bond line gap 78. A stepped inside diameter is formed by the assembled and bonded tubular halves to form a shoulder 79. Thus, the larger diameter portion 80 of assembled sleeve 72 would receive leg 61 of joint cluster 31 and the smaller diameter portion 81 of sleeve 72 would receive the smaller elongated tubular segment 36. Each of the split tubular sleeves 70, 71, 72, 73, 74 and 75, as the name implies, are formed of two pieces and are connected together and to the joint legs and tubular segments by a suitable adhesive. One suitable paste-type, room temperature curing, modified epoxy adhesive that has proved suitable in practice of the present invention is EPON 911S, a product of the Shell Chemical Company. A detailed description of EPON 911S may be found in the Shell Chemical Company brochure dated 10-62, pages 34A–34F, inclusive, entitled EPON ADHESIVES 911F and 911S.

MATERIALS AND FABRICATION

As mentioned hereinbefore, the truss-type structures of the present invention have been fabricated from 6061-T6 aluminum, beryllium and Be-38AL alloy and uniaxial boron and glass filament reinforced epoxy tubing. The nominal wall thickness of the aluminum tubing used ranged from 0.020 to 0.058 inch or 0.51–1.47 mm.; that for the Be-38AL and the beryllium was 0.020 inch or 0.51 mm.; the S-glass filament reinforced epoxy tubing was 0.024 inch or 0.46 mm.; and, the boron filament reinforced epoxy tubing was 0.012 to 0.018 inch or 0.30–0.46 mm. The joints of the bonded trusses were designed to be twice as strong as the truss members and this was readily accomplished by the use of the adhesive EPON 911S. The design shear strength of the adhesive was based on the bonding studies and was 2,000 psi.

The aluminum tubing employed to make the joint clusters was machined and welded into the unitary cluster configuration by utilizing a suitable fixture that spaced the legs of the joint at the designed angular relationship. Both the welding schedule and the design of the welding fixture were chosen to minimize welding distortions. The welding schedule included balanced initial tack and final weld passes. Inert gas welding was used to patch the occasional small burnthroughs which occurred at the beginning and end of some of the more complex joint intersections. Inert gas welding was also used to "-pull" joints that had been slightly distorted during electron-beam welding passes. The average net-section tensile strength of the gas-welded tubular joint cluster was found to be 25 ksi. After welding, the joint cluster legs were cut to the desired final length. The split collars 70–75 used to form the final truss configuration were machined for aluminum tubing. These collars had a minimum wall thickness of 0.020 inch and a constant outside diameter as shown in FIG. 5. The split, two-piece collars or sleeves used in the present invention avoid the adhesive distribution problems normally associated with bonded telescoping joints.

The elongated tubular truss members were cut to the desired length to provide a clearance of 0.005 inch between them and each of the joint cluster legs to facilitate truss assembly. These elongated tubular members, the joint cluster legs and the split collars were cleaned in a conventional manner prior to the bonding assembly. Identical cleaning procedures were employed for the aluminum, beryllium, the Be-38AL alloy, and the S-glass and boron filament reinforced epoxy tubing. A minimum adhesive thickness of 0.005 inch was maintained at the bond line in all sleeves by adding approximately 1 percent of mass of sieved ($-120 +140$ mesh) glass beads to the adhesive before mixing. The vertical truss members, were bonded in place first and allowed to cure overnight prior to clamping the horizontal members in place and bonding of these members. After all parts of the complete truss-type structure, as shown in FIGS. 1 and 2, were bonded, the entire assembly was allowed to cure at room temperature for 5 days prior to stress and tensile testing. The term "thin-walled" as used in the description and claims of the present invention means that the tube diameter/thickness ratio is 10 or greater.

Although the invention has been described relative to a specific truss-type configuration, it is not so limited and obvious variations and modifications in the truss design, the use of other materials, and other connections for the various components, will be readily apparent to those skilled in the art in the light of the teachings herein.

Accordingly, it is therefore to be understood that within the scope of the appended claims the invention may be practiced otherwise than as specifically described.

What is claimed as new and desired to be secured by Letters Patent of the United States is:

1. A lightweight truss structure comprising:
   a plurality of angular disposed elongated tubular segments,
   a plurality of joint clusters serving to connect said plurality of tubular segments into a unitary structure,
   each said joint cluster being formed of a plurality of short tubular legs integrally connected in an angular disposed relationship into a single unit,
   each tubular leg of each said joint cluster serving to connect with one of said plurality of angular disposed tubular segments,
   a split sleeve member being disposed on the end of each tubular leg of said joint cluster, said split sleeve member serving to receive an end of one of said plurality of angular disposed tubular segments, and being adhesively joined to both the tubular leg of said joint cluster and the end of the angular tubular segment received thereby,
   selected ones of said angular disposed tubular segments being of different diameter from the tubular leg of said joint cluster connected thereto and the split sleeve member connecting these parts being of stepped configuration,
   each said joint cluster being formed of lightweight thin-walled tubular members and each said angular disposed tubular segment being formed of thin-walled tubes selected from the group consisting of beryllium, Be-38Al, aluminum, S-glass filament reinforced epoxy and boron filament reinforced epoxy and each tubular member having a tube diameter/thickness ratio of at least 10, and
   wherein a plurality of foot pad members are provided at one end of the truss structure and a single top fitting member is provided at the other end of the truss structure, said plurality of foot pad members and said single top fitting member each being adapted to be rigidly attached to structure requiring truss support and each said foot pad member and said top fitting being integrally connected to one of said joint clusters.

* * * * *